Figure 1:
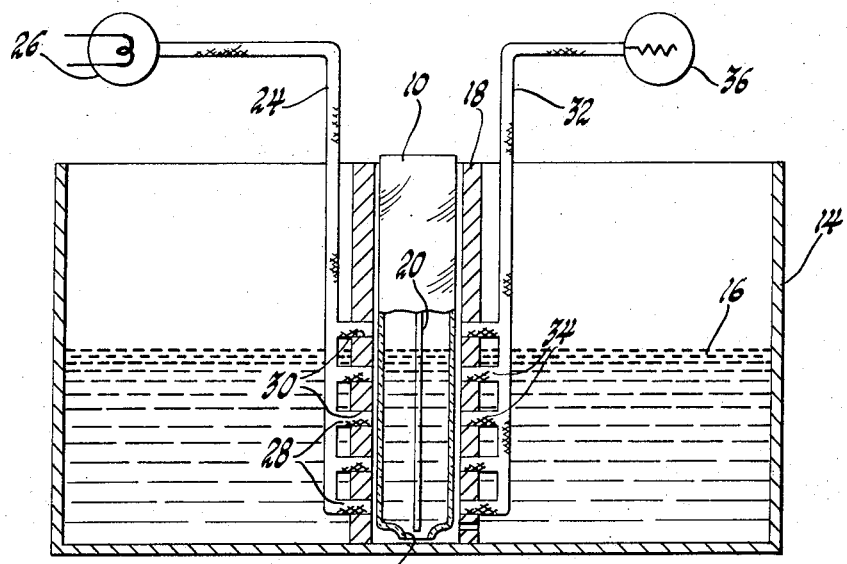

United States Patent
Giesecke

[11] 3,794,428
[45] Feb. 26, 1974

[54] OPTICAL LIQUID LEVEL INDICATOR
[75] Inventor: Heinz Giesecke, Rochester, Mich.
[73] Assignee: General Motors Corporation, Detroit, Mich.
[22] Filed: Apr. 21, 1972
[21] Appl. No.: 246,434

[52] U.S. Cl. .................. 356/156, 73/293, 356/244
[51] Int. Cl. ............................................ G01b 11/00
[58] Field of Search ...... 356/156, 128, 133; 73/293; 350/267; 250/218 X

[56] References Cited
UNITED STATES PATENTS
| | | | |
|---|---|---|---|
| 2,197,190 | 4/1940 | Mott-Smith | 350/267 |
| 1,532,995 | 4/1925 | Gage | 73/293 |
| 2,369,798 | 2/1945 | Rasmussen | 73/293 |
| 3,370,469 | 2/1968 | Mackenzie | 356/156 |
| 3,120,125 | 2/1964 | Vasel | 356/156 |

Primary Examiner—Ronald L. Wibert
Assistant Examiner—Conrad Clark
Attorney, Agent, or Firm—Warren D. Hill

[57] ABSTRACT

A transparent standpipe in a liquid container has plano-convex cylindrical lenses integrally formed in opposite sides thereof and has aligned with the lenses a diaphragm containing a slit. An elongated light source and an elongated light detector are placed on opposite sides of the standpipe in alignment with the lenses. The light is focused through the slit onto the detector only where liquid is present.

3 Claims, 3 Drawing Figures

PATENTED FEB 26 1974  3,794,428

OPTICAL LIQUID LEVEL INDICATOR

This invention relates to an optical liquid level detector.

It is desirable to provide an inexpensive and accurate liquid level detector particularly for use in closed containers such as vehicle fuel tanks. Typically, fuel level sensors for vehicles are electro-mechanical devices comprising a float operated rheostat which must be carefully designed and fabricated to assure integrity of moving parts over a long life. It is desirable then to provide a liquid level detector having no moving parts.

It is therefore an object of the invention to provide an optical liquid level detector which has a high degree of sensitivity to liquid level changes.

It is another object of the invention to provide such an optical liquid level detector having no moving parts.

Figure 2:
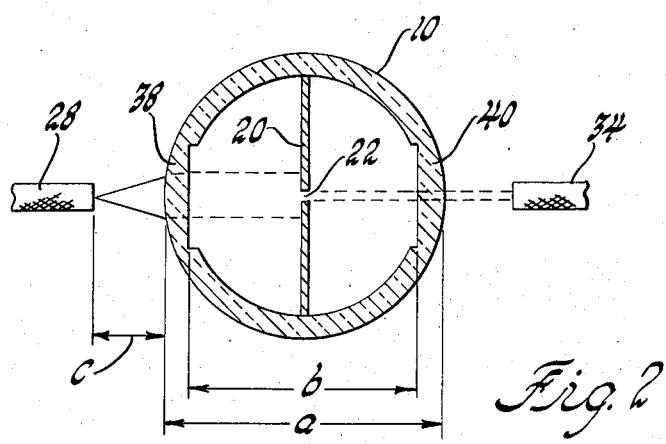
Figure 3:
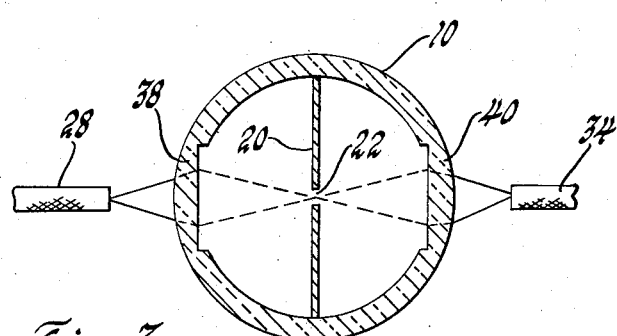

The invention is carried out by providing a standpipe containing liquid at the level of the liquid being monitored with a lens in opposite sides thereof for focusing light from an external source onto an external detector wherein the amount of light reaching the detector from the source depends upon the presence of liquid in the standpipe such that the liquid, due to its high index of refraction in conjunction with the lens, efficiently focuses the light onto the detector only where the liquid is present, the total light being received by the detector then being a function of liquid level. The above and other advantages of the invention will be made more apparent from the following specification taken in conjunction with the accompanying drawings wherein like reference numerals refer to like parts and wherein:

FIG. 1 is a cross-sectional elevational view of a fuel level detector according to the invention; and, FIGS. 2 and 3 are cross-sectional plan views of the detector of FIG. 1 illustrating its operation in the absence of liquid and in the presence of liquid respectively.

FIG. 1 shows a liquid level detector which includes a standpipe 10 comprising a transparent cylinder preferably made of annealed glass having a port 12 at the bottom to admit liquid to the interior of the standpipe from the container 14 in which the liquid 16 is held. A cylindrical metallic holder 18 surrounds and supports the standpipe 10. The center of the standpipe contains a diaphragm 20 containing a central axially disposed slit 22 as best seen in FIGS. 2 and 3. An extended light source comprises an array of fiber optic light conductors 24 each having one end illuminated by a lamp 26. The opposite ends of the light conductors 24 are divided into several light emitting terminals 28 secured in ports 30 vertically spaced along one side of the holder 18. An extended light detector comprises fiber optic conductors 32 which include several light collecting terminals 34 secured in ports at the opposite side of the holder and aligned with the emitting terminals 28. The conductors 32 lead to a common light detector 36 which may be a photosensitive detector such as a photoresistive CdSe photosensor. The light source 26 and the detector 36 are located either inside or outside the container 14.

As seen in FIGS. 2 and 3, two elongated cylindrical plano-convex lenses 38 and 40 are integrally formed in the transparent standpipe by providing an inner flat surface at the place where each lens is desired, the outer convex surface of each lens having the same radius of curvature as the remainder of the outer wall of the standpipe 10.

Thus an optical system is provided including the light emitters 28, the lens 38, the slit 22, the lens 40 and the light collectors 34 all in alignment. The dimensions of the system are so selected that when liquid is present in the standpipe between a given emitter and detector, the light from the emitter 28 will be focused by the lens 38 through the slit 22 and onto the lens 40 which refocuses the light into the collector 34 to provide a relatively intense beam of light reaching the collector as illustrated in FIG. 3. When, however, the liquid is not present between a given emitter and collector and is replaced by air or vapor which has a significantly lower index of refraction than the liquid, the optical properties of the lens 38 are changed so that the major portion of the light beam from the emitter 28 is not focused through the slit 22, but rather is directed primarily onto the diaphragm. Consequently, only a minor portion of the light beam passes through the lens 40 to the collector 34 and the collector receives a relatively weak beam of light. It is apparent then that the intensity of the light reaching the detector 36 is a direct function of the height of the liquid in the standpipe, the light being most intense at a high liquid level and the least intense at a low liquid level.

A specific example of the optical system when used for gasoline is as follows. The diameter a of the pipe is 8 millimeters, the distance b between the plane lens surfaces is 6 millimeters and the distance c of the emitter 28 from the front of the lens 38 is 4 millimeters, the spacing of the collector 34 from the lens 40 being the same. When the width of the slit 22 is 1 millimeter, the ratio of the light intensity received at the collector in air as compared to gasoline is 1:16. Thus a dramatic change of light intensity occurs with liquid level change to give a high sensitivity to level change.

It will be apparent that the liquid level detector according to this invention is accurate, simple to construct, has no moving parts and in maintenance free except possibly for the electrical components involved which may be located in a readily servicable area.

It will further be seen that the light detector 36 is not an essential component of the system. Rather, the individual fiber optic light collectors 34 may lead to a remote display station and be arranged in a lineal array so that the relative light intensities at the display station will be directly observed for an indication of liquid level. Further, it should be noted that a similar system may be afforded by omitting the diaphragm and choosing the optical parameters such that in the absence of liquid the light beam will be widely divergent as it passes through the standpipe so that only a portion of the light will be intercepted by the lens 40 and focused onto the detector while in the presence of liquid, the entire light beam will be focused on the lens 40. Such a modified system is simpler but also less sensitive than the preferred embodiment since the ratio of light reaching the lens 40 in the presence of air compared to that in liquid is much less favorable.

The embodiment of the invention described herein is for purposes of illustration and the scope of the invention is intended to be limited only by the following claims:

1. An optical device for detecting the level of liquid within a container comprising a hollow standpipe for holding liquid at the level of the liquid within the container, a light source outside the standpipe at one side and a single light detector outside the standpipe at the opposite side, the source and detector being extended along the standpipe, means for focusing an intense light beam onto the detector from the light source only where liquid is in the light beam between the source and the detector and for focusing a weak light beam onto the detector where liquid is absent between the source and the detector, said means comprising an optical system including a lens in each side of the standpipe aligned with the light source and detector for directing the light from the source toward the detector, and diaphragm means within the standpipe for defining an elongated slit aligned with the source and the detector, the optical parameters being chosen to focus an intense light beam through the slit and onto the detector where liquid is in the light beam between the lenses and where liquid is not in the light beam to direct a major portion of the light onto the diaphragm so that a relatively weak light beam passes through the slot to the detector, whereby the total amount of light reaching the detector is a function of the liquid level.

2. An optical device for detecting the level of liquid within a container comprising a hollow transparent standpipe for holding liquid at the level of the liquid within the container, a light source outside the standpipe at one side and a single light detector outside the standpipe at the opposite side, the source and detector being extended along the standpipe, means for focusing an intense light beam onto the detector from the light source only where liquid is in the light beam between the source and the detector and for focusing a weak light beam onto the detector where liquid is absent between the source and the detector, said means comprising an optical system including a diaphragm having an elongated slit centrally disposed within the standpipe and aligned with the source and detector, and a cylindrical plano-convex lens integrally formed in each side of the standpipe aligned with the light source and detector, one of the lenses being formed to focus the light beam through the slit to the other lens only in the presence of liquid, the other lens formed to focus the light onto the detector, the one lens directing a major portion of the light beam onto the diaphragm in the absence of liquid so that a relatively weak light beam reaches the detector whereby the total amount of light reaching the detector is a function of the liquid level.

3. An optical device for detecting the level of liquid within a container comprising a hollow transparent standpipe for holding liquid at the level of the liquid within the container, a light source comprising a lamp and a fiber optic light conductor terminating in an elongated light emitter outside the standpipe at one side and a light collecting means comprising a fiber optic light conductor having an elongated light collector outside the standpipe at the opposite side and terminating at a single light detector, means for focusing an intense light beam onto the collector from the light emitter only where liquid is in the light beam between the emitter and the collector and for focusing a weak light beam onto the collector where liquid is absent between the emitter and the collector, said means comprising an optical system including a lens formed in each side of the standpipe aligned with the light emitter and collector for detecting the light from the source toward the detector, and diaphragm means within the standpipe for defining an elongated split alinged with the emitter and the collector, the optical parameters being chosen to focus an intense light beam through the slit and onto the collector where liquid is in the light beam between the lenses and where liquid is not in the light beam to direct a major portion of the light onto the diaphragm so that a relatively weak light beam passes through the slit to the collector whereby the total amount of light reaching the detector is a function of the liquid level.

* * * * *